(12) United States Patent
Brown et al.

(10) Patent No.: US 6,355,086 B2
(45) Date of Patent: Mar. 12, 2002

(54) METHOD AND APPARATUS FOR MAKING COMPONENTS BY DIRECT LASER PROCESSING

(75) Inventors: Lawrence Evans Brown, Indianapolis; Timothy Paul Fuesting, Thorntown, both of IN (US); Joseph Jefferson Beaman, Jr.; Suman Das, both of Austin, TX (US)

(73) Assignees: Rolls-Royce Corporation, Indianapolis, IN (US); Board of Regents, The University of Texas, Austin, TX (US)

( * ) Notice: Subject to any disclaimer, the term of this patent is extended or adjusted under 35 U.S.C. 154(b) by 0 days.

(21) Appl. No.: 08/910,044

(22) Filed: Aug. 12, 1997

(51) Int. Cl.$^7$ .................................................. C22C 1/00
(52) U.S. Cl. ............................. 75/235; 75/236; 75/244; 428/539.5; 428/545
(58) Field of Search .............................. 428/539.5, 545; 75/235, 236, 244

(56) References Cited

U.S. PATENT DOCUMENTS

| | | |
|---|---|---|
| 4,169,020 A | 9/1979 | Stalker et al. |
| 4,222,706 A | 9/1980 | Ayache et al. |
| 4,232,995 A | 11/1980 | Stalker et al. |
| 4,377,371 A | 3/1983 | Wisander et al. |
| 4,589,823 A | 5/1986 | Koffel |
| 4,610,698 A | 9/1986 | Eaton et al. |
| 4,611,744 A | 9/1986 | Fraser et al. |
| 4,627,896 A * | 12/1986 | Nazmy et al. ............. 204/37.1 |
| 4,675,204 A | 6/1987 | Nicoll et al. |
| 4,680,199 A | 7/1987 | Vontell et al. |
| 4,689,242 A | 8/1987 | Pike |
| 4,735,656 A * | 4/1988 | Schaefer et al. ............ 75/238 |
| 4,744,725 A | 5/1988 | Matarese et al. |
| 4,802,828 A | 2/1989 | Rutz et al. |
| 4,808,055 A | 2/1989 | Wertz et al. |
| 4,818,833 A | 4/1989 | Formanack et al. |
| 4,851,188 A | 7/1989 | Schaefer et al. |
| 4,854,196 A | 8/1989 | Mehan |
| 4,863,538 A | 9/1989 | Deckard |
| 4,884,820 A | 12/1989 | Jackson et al. |
| 4,938,916 A | 7/1990 | Beaman et al. |
| 4,944,817 A | 7/1990 | Bourell et al. |
| 5,045,972 A * | 9/1991 | Supan et al. ................. 361/387 |
| 5,048,183 A | 9/1991 | Cang et al. |
| 5,053,090 A | 10/1991 | Beaman et al. |
| 5,076,869 A | 12/1991 | Bourell et al. |
| 5,104,293 A * | 4/1992 | Eaton, Jr. et al. ........ 416/241 B |
| 5,113,582 A | 5/1992 | Monson et al. |
| 5,134,032 A * | 7/1992 | Cooper, Jr. et al. ......... 428/403 |
| 5,156,697 A | 10/1992 | Bourell et al. |
| 5,210,944 A | 5/1993 | Monson et al. |
| 5,264,011 A | 11/1993 | Brown et al. |
| 5,352,405 A | 10/1994 | Beaman et al. |
| 5,359,770 A | 11/1994 | Brown et al. |
| 5,382,308 A | 1/1995 | Bourell et al. |
| 5,431,967 A | 7/1995 | Manthiram et al. |
| 5,449,536 A | 9/1995 | Funkhouser et al. |
| 5,453,329 A | 9/1995 | Everett et al. |
| 5,476,363 A * | 12/1995 | Fredling et al. ......... 415/173.1 |
| 5,486,281 A | 1/1996 | Gruver et al. |
| 5,514,482 A | 5/1996 | Strangman |
| 5,576,069 A | 11/1996 | Chen et al. |
| 5,597,589 A | 1/1997 | Deckard |
| 5,603,603 A | 2/1997 | Benoit et al. |

OTHER PUBLICATIONS

Irving, Robert. "Taking a Powder" *Mechanical Engineering*. Sep. 1999, pp. 55–59.

* cited by examiner

*Primary Examiner*—Ngoclan Mai
(74) *Attorney, Agent, or Firm*—Woodard, Emhardt, Naughton Moriarty & McNett

(57) ABSTRACT

The present invention relates to a method an apparatus for fabricating a component by a direct laser process. One form of the present invention contemplates a gas turbine engine blade having an abrasive tip formed directly thereon.

32 Claims, 8 Drawing Sheets

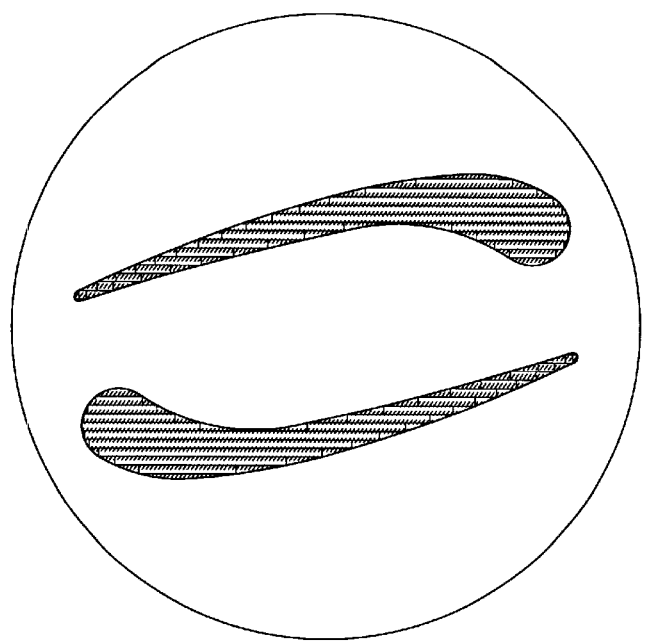
*Fig. 10*
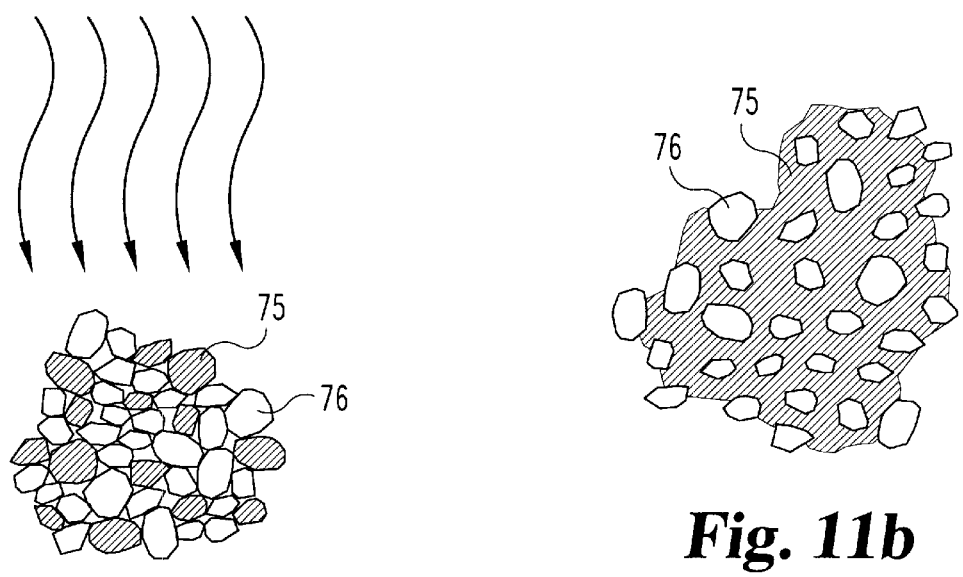
*Fig. 11a*  *Fig. 11b*

METHOD AND APPARATUS FOR MAKING COMPONENTS BY DIRECT LASER PROCESSING

This invention was made with Government support under Contract No. F33616-C-2424 awarded by the United States Air Force. The Government has certain rights in this invention.

BACKGROUND OF THE INVENTION

The present invention relates generally to the fabrication of components by the direct laser fusing of the material constituents. More particularly, the present invention has one form wherein the material constituents are directly melted by a laser and solidified to produce a high density part requiring little or no post processing. While, the present invention was developed for fabricating gas turbine engine components, certain applications may be outside of this field.

Since its inception in the 1930's, the gas turbine engine has grown to be the workhorse power plant of modern aircraft. Over the years, there has been significant advances in the technology related to aircraft propulsion systems, and the methods of manufacturing these system components. Associated with the technological advances has been a desire to reduce engine life cycle costs by minimizing acquisition, operating, and maintenance costs. While there are many ways to reduce engine life cycle costs, one approach may be through technological developments such as advanced materials, innovative structural designs, improved aerothermodynamics, improved computational methods, and advanced manufacturing techniques.

Traditional manufacturing techniques have typically coupled the cost of manufacturing a part with the volume of parts produced. Manufacturing techniques that are designed for large scale production, such as casting and extrusion are often cost effective, but these manufacturing techniques are generally unacceptable for small quantities of parts. Another traditional manufacturing technique for producing parts is powder metallurgy which requires a tool for shaping the powder, therefore often rendering the powder metallurgy process unattractive for producing a limited quantity of parts.

Where only a small quantity of parts are desired, conventional subtractive machining method are often employed to produce the part. As is generally known to one familiar with manufacturing and machining processes, a conventional subtractive machining method utilizes the removal of a portion of the material from the initial block of material to produce the desired shape. Examples of conventional subtractive machining methods include: broaching, drilling, electric discharge machining, flame cutting, grinding, turning, etc. While the conventional subtractive machining methods are usually effective in producing the desired component, they have a multitude of limitations.

One limitation common to the conventional subtractive machining processes is the waste of a large amount of raw material. The conventional machining process usually involve an extensive setup to properly machine the part, and the setup and operation of the machine often relies a great deal on operator judgment and expertise. Another limitation associated with many conventional subtractive machining methods is the inaccuracies imparted into the manufacturing process due to machine and tooling wear. Further, an additional limitation of many conventional machining techniques relates to the difficulty of making certain part configurations. Therefore, there are certain configurations in which the part must be divided into segments for machining due to the inability of a cutting tool to produce the desired configuration.

There are other manufacturing processes which are additive in nature. The type of processes that would be classified as additive in nature include plating, cladding, flame spraying, welding, laminating, etc. However, these processes are generally used in conjunction with the conventional subtractive machining techniques to produce a component that cannot be directly machined.

Even with a variety of earlier methods and apparatus for manufacturing components, there remains a need for a method and apparatus for making components by direct laser processing. The present invention satisfies this need in a novel and unobvious way.

SUMMARY OF THE INVENTION

One embodiment of the present invention contemplates a an apparatus comprising a free form fabricated gas turbine component having a structure consistent with a metallurgical casting with a refined microstructure.

One object of the present invention is to provide a fabricated component for use in a gas turbine engine.

Related objects and advantages of the present invention will be apparent from the following description.

BRIEF DESCRIPTION OF THE DRAWINGS

FIG. 10 is an illustrative view of a laser scan path for the processing of one embodiment of the abrasive cermet blade tips.

FIG. 11a represents a portion of the unmelted material constituents that are utilized in the direct laser process.

FIG. 11b represents a portion of the material of FIG. 11a that has been melted and allowed to solidify by the direct laser process.

DESCRIPTION OF THE PREFERRED EMBODIMENT

Figure 1:
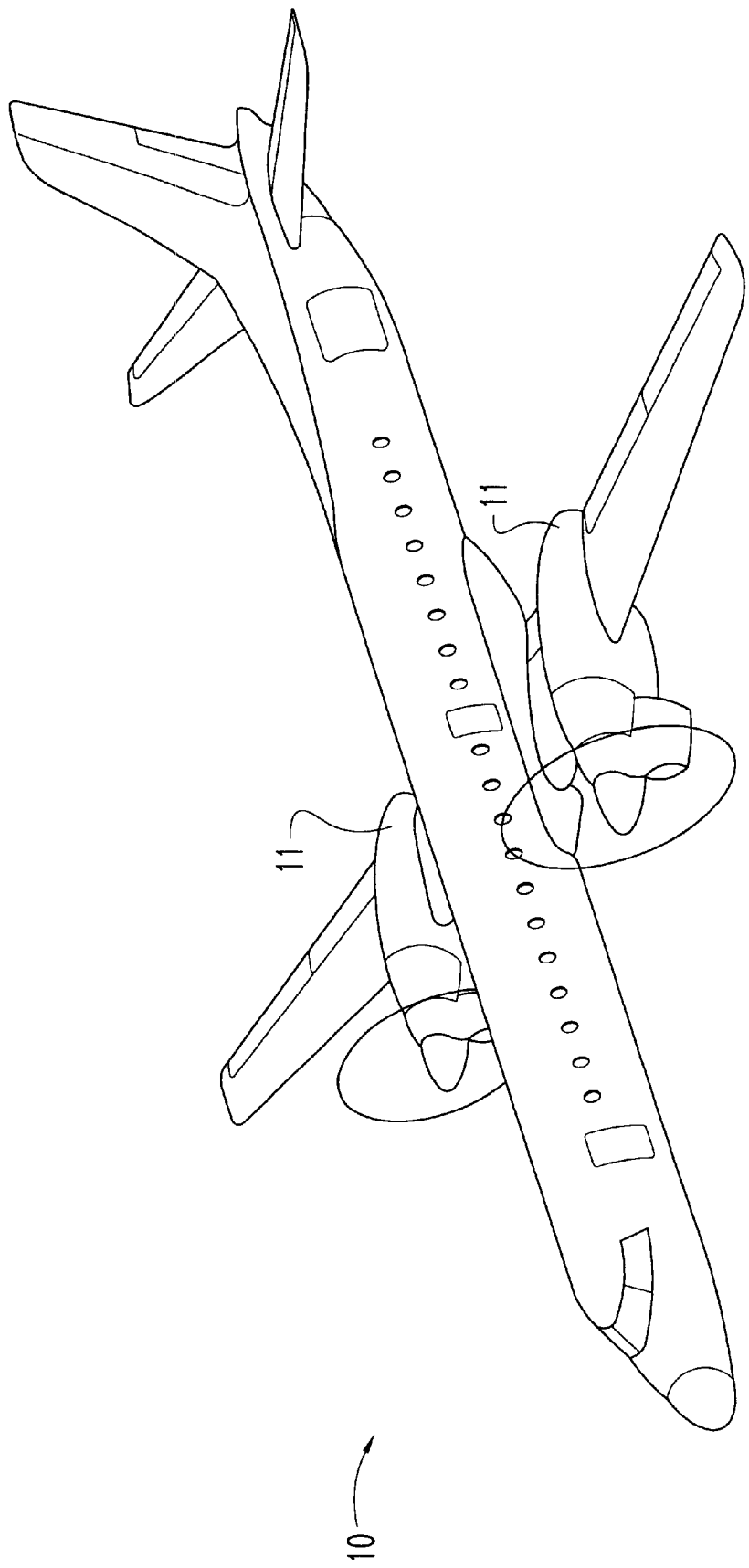
FIG. 1 is a perspective view of an aircraft having a gas turbine engine connected thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
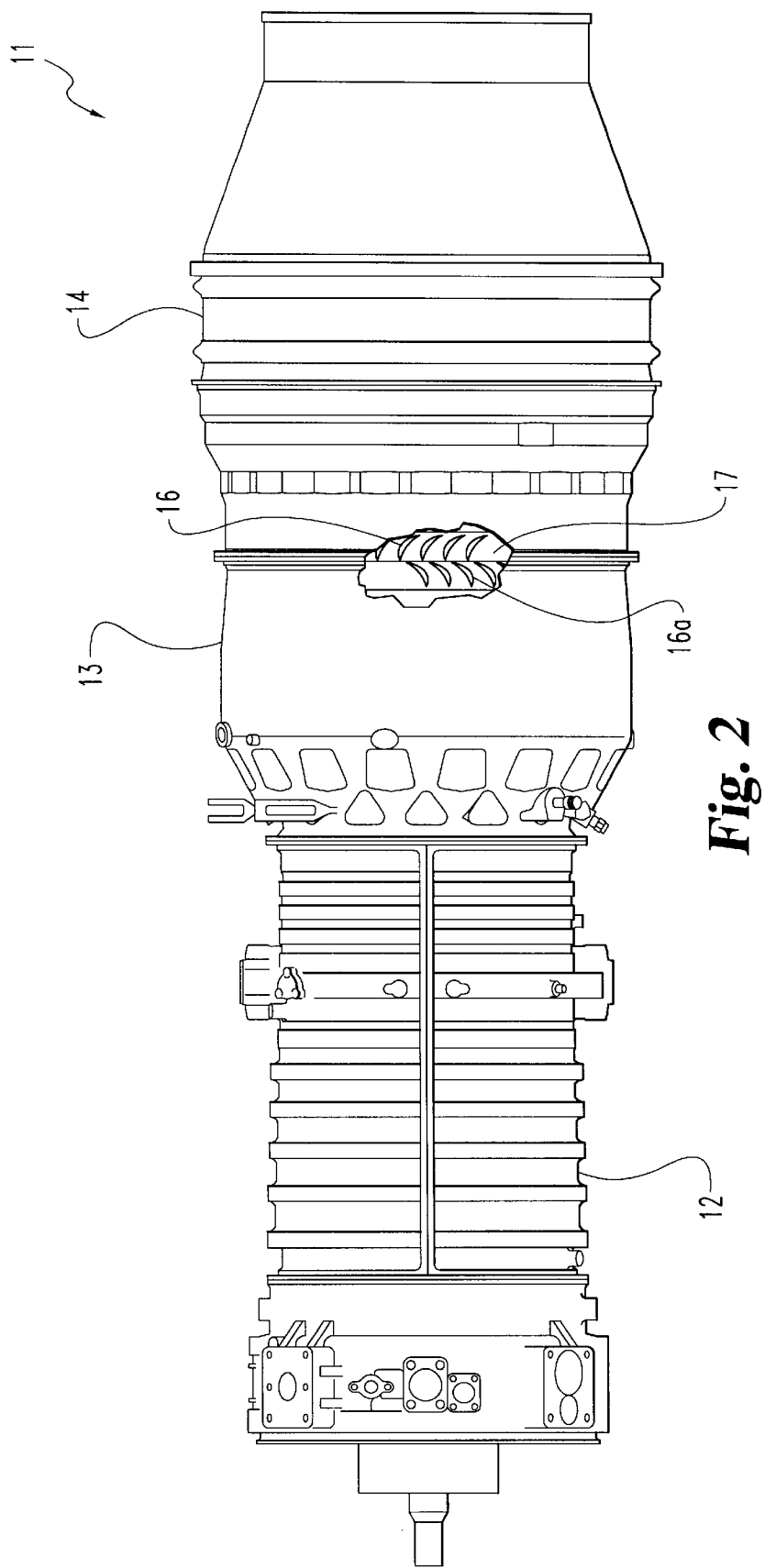
FIG. 2 is an enlarged partially fragmented side elevational view of the gas turbine engine of FIG. 1.

Referring to FIGS. 1 and 2, there is illustrated an aircraft 10 including an aircraft flight propulsion engine 11. It is understood herein that an aircraft is generic and includes helicopters, tactical fighters, trainers, missiles and other related apparatus. In the preferred embodiment, the flight propulsion engine 11 includes a compressor 12, a combustor 13 and a power turbine 14. It is important to realize that there are a multitude of ways in which the components can be linked together. Additional compressors and turbines can be added with intercoolers connected between the compressors and reheat combustion chambers could be added between the turbines. Further, the gas turbine engine is equally suited to be used for industrial applications. Historically, there has been the widespread application of industrial gas turbine engines, such as pumping sets for gas and oil transmission lines, electricity generation and naval propulsion.

With reference to FIG. 2, there is illustrated the enlarged partially fragmented view of the gas turbine engine 11. The gas turbine engine 11 having a rotor disk 17, with a plurality of turbine blades 16 mounted thereto, that is coupled to a shaft (not illustrated) within the gas turbine engine 11. A plurality of turbine vanes 16a form a nozzle within the gas turbine engine for directing the flow of working fluid relative to the blades 16. In the preferred form of the present invention the working fluid is air extracted from the compressor 12.

Figure 3:
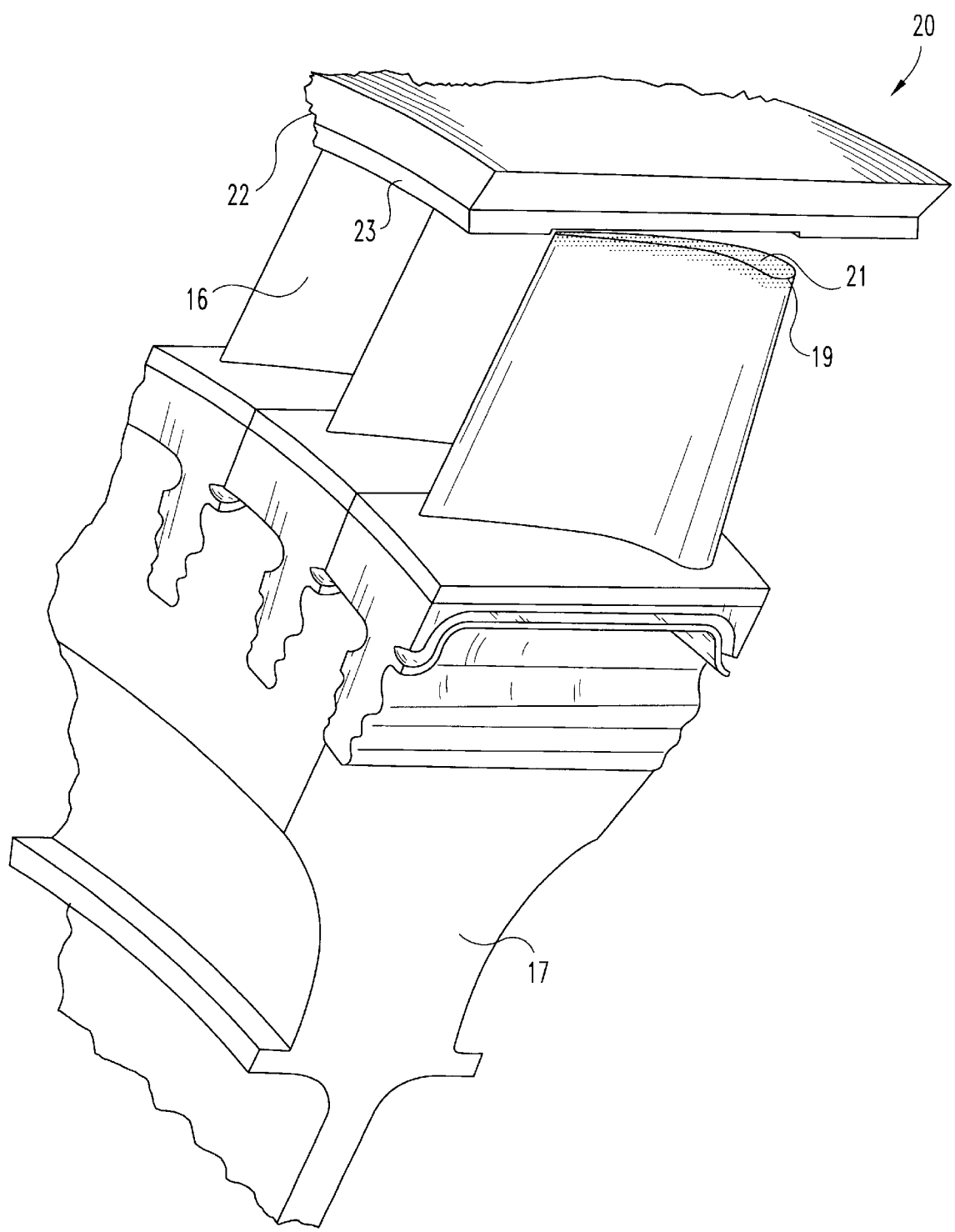
FIG. 3 is a partial perspective view of one embodiment of a seal system comprising a portion of the FIG. 2 gas turbine engine.

With reference to FIG. 3, there is illustrated a portion of a working fluid sealing system 20. The sealing system 20 is designed to minimize the leakage of working fluid away from and around the working fluid path. The efficiency of the gas turbine engine is dependent upon the ability to control and minimize the leakage of this working fluid. Thus, the clearance between the tip 19 of the turbine blade 16 and the static structure 22 of the gas turbine engine assists in controlling the bypassing of the rotor 17 and turbine blades 16 by the working fluid. Clearance between the rotating and static components (21 and 23 respectively) changes with the expansion and contraction of the components due to the thermal cycling occurring in the gas turbine engine.

In one form of the present invention, the sealing system 20 comprises the two corresponding components that form a virtual seal between the rotating and static components. The two components are an abrasive component 21 that is coupled to the turbine blade 16, and a stationary abradable component 23 which is coupled to the stationary component 22. The stationary abradable component 23 is often referred to as a shroud and is a member that circumscribes the rotor disk 17 and blades 16 while covering a portion of the stationary component 22.

The turbine blade 16 with abrasive component 21 rotates relative to the abradable component 23 to wear-form a virtual seal track in the abradable component 23. The rotation of the rotor disk 17 with turbine blades 16 coupled thereto allows the abrasive components 21 to abrade the abradable component 23 when there is no clearance between the respective components. A particular aspect of the abrasive component 21 is the ability to withstand repeated and severe encounters with the abradable component 23 with only minimal loss of material from the abrasive component 21 and preferential wear of the abradable component 23. Thus, instead of a rubbing interface between the components 21 and 23 when the radial clearance therebetween has disappeared the abrasive component 21 cuts the abradable component 23 to maintain a minimum clearance therebetween. The abrasion of the abradable component 23 by the rotating abrasive component 21 forms a fluid passageway between the rotating components. In one form of the present invention, the abradable component 23 is a semi-porous abradable ceramic that is generally known to those of ordinary skill in the art.

Figure 4:
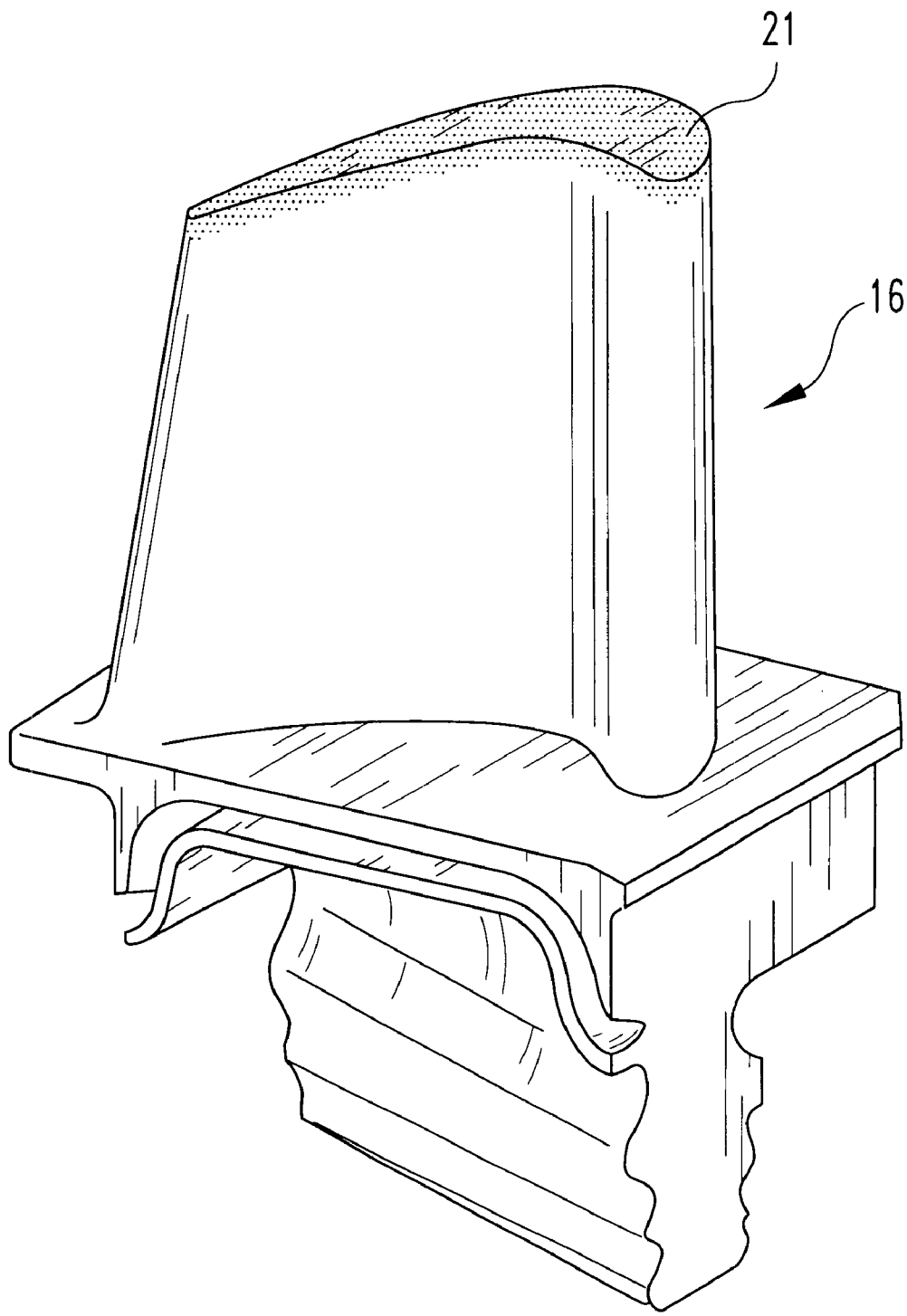
FIG. 4 is a perspective view of one embodiment of the turbine blade with an abrasive cermet tip comprising a portion of the FIG. 3 seal system.

With reference to FIG. 4, there is illustrated one embodiment of the turbine blade 16. The turbine blade 16 can be of a wrought or cast structure. In the preferred embodiment, the gas turbine blade 16 is a unitary cast alloy structure produced by a precision casting operation utilizing various super alloy compositions. Various types of nickel, titanium, and cobalt super alloy compositions and manufacturers of such compositions are known to those skilled in the art. Most super alloy compositions of interest are complicated mixtures of either titanium, tin, vanadium, aluminum, molybdenum, silicon, neodymium and other select materials; or nickel, cobalt, chromium, aluminum, titanium, iron, tungsten, tantalum, rhenium and other select elements. A preferred group of materials are generally known by the following tradenames CMSX-3, CMSX-4 and MARM-247, and are readily available and known to people of ordinary skill in the art. However, the application of the present invention is not intended herein to be limited to the above materials, and can be utilized with other materials. A technique for producing a cast unitary turbine blade 16 having equiaxed, directionally solidified or single crystal alloy structures is disclosed in U.S. Pat. No. 5,295,530 to O'Connor which is incorporated by reference herein. A gas turbine blade and a gas turbine vane are often referred to as an airfoil.

The abrasive component 21 is metallurgically bonded to the blade 16 without the presence of a brazing element or other lower melting temperature joining materials. Elimination of the low melting point braze element produces a brazeless cermet having an extended oxidation life and the capability to withstand exposure to higher operating temperatures than components having the braze element. The abrasive component 21 comprising an abrasive cermet composition which includes a metal powder superalloy matrix combined with ceramic abrasive particles. In one form of the present invention the ceramic abrasive particles are coated with a reactive material, and in a second form of the present invention the ceramic abrasive particles are not coated with a reactive material. In one form of the present invention the material composition comprises about 0 wt. % to about 50.0 wt. % ceramic abrasive particles coated with a reactive metal, and about 50.0 wt. % to about 100.0 wt. % superalloy. The ceramic abrasive particles being of a ceramic grit material, and more preferably of at least one of the following: cubic boron nitride; man made diamond; silicon carbide; and aluminum oxide. Further, one embodiment of the present invention contemplates a mixture of at least two of the ceramic grit materials. A more preferred form of the present invention utilizes a mixture of cubic boron nitride and aluminum oxide. In one embodiment the ceramic abrasive particles having a grit size in the range between 80 mesh size and 120 mesh size. It is understood herein that other particle sizes and ceramic grit materials are contemplated herein. The reactive material is preferably titanium which serves to wet the surface of the ceramic abrasive coating to promote a metallurgical bond between the particles and the metal matrix. The titanium coating has preferably been applied using known fluid bed chemical vapor deposition techniques so as to ensure uniformity of the coating on the particles. However, other suitable processes known in the art are acceptable. The ceramic abrasive particles may be homogenous or graded through any portion of the component.

In one form of the present invention, the bed of material that forms the abrasive component 21 is subjected to a direct through thickness laser processing which causes the metal matrix material to become molten, solidify and bond with the turbine blade 16. Direct laser processing is a manufacturing technique for fabricating parts from a powder bed, and details pertaining to the direct laser process utilized to make the abrasive tipped blade 16 are provided below. This method is applicable to an entire region of material, a select region of material, and for cutting portions of the component. The direct tipping of the blade with the abrasive component 21 through the direct laser process produces a component free of the life degradation that results from many prior art methods that includes the addition of melting point depressants typically present in braze alloys and/or that require exposing the components to a high temperature brazing and/or a diffusion bonding thermal cycle which degrades the morphology of the strengthing phase.

Figure 5:
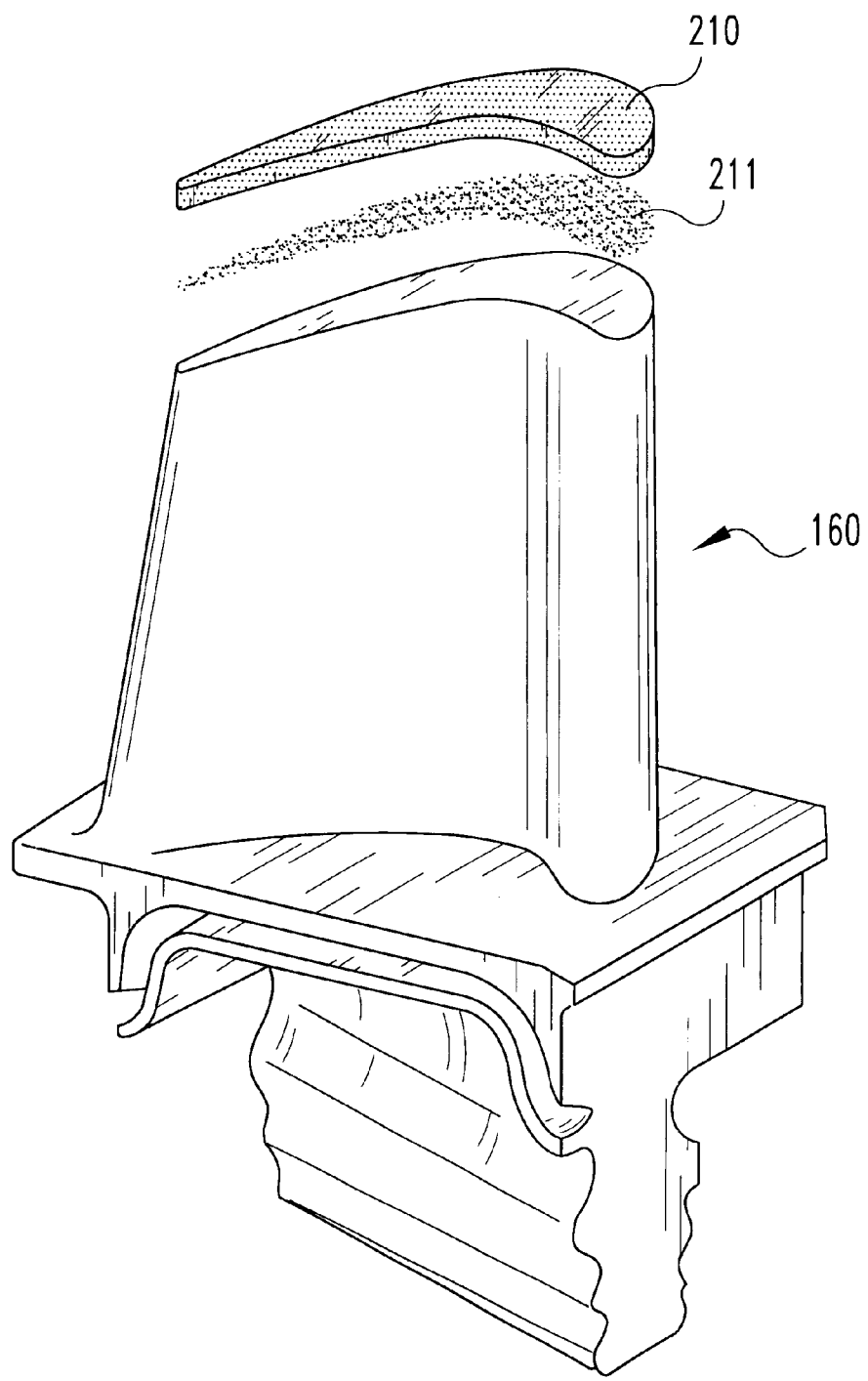
FIG. 5 is a partially exploded view of an alternate embodiment of the gas turbine blade with an abrasive cermet tip.

With reference to FIG. 5, there is illustrated an alternate embodiment of the gas turbine engine blade 160 with an abrasive cermet component 210 coupled thereto by a secondary joining operation. The secondary joining operation is generally a brazing operation utilizing a brazing material 211 that couples the abrasive component 210 to the blade 16. In one form of the present invention the abrasive component 210 is fabricated by the direct laser process that is used to produce the abrasive component 21. Thereafter the abrasive component 210 is joined to blade 160 with the brazing material 211.

Figure 6:
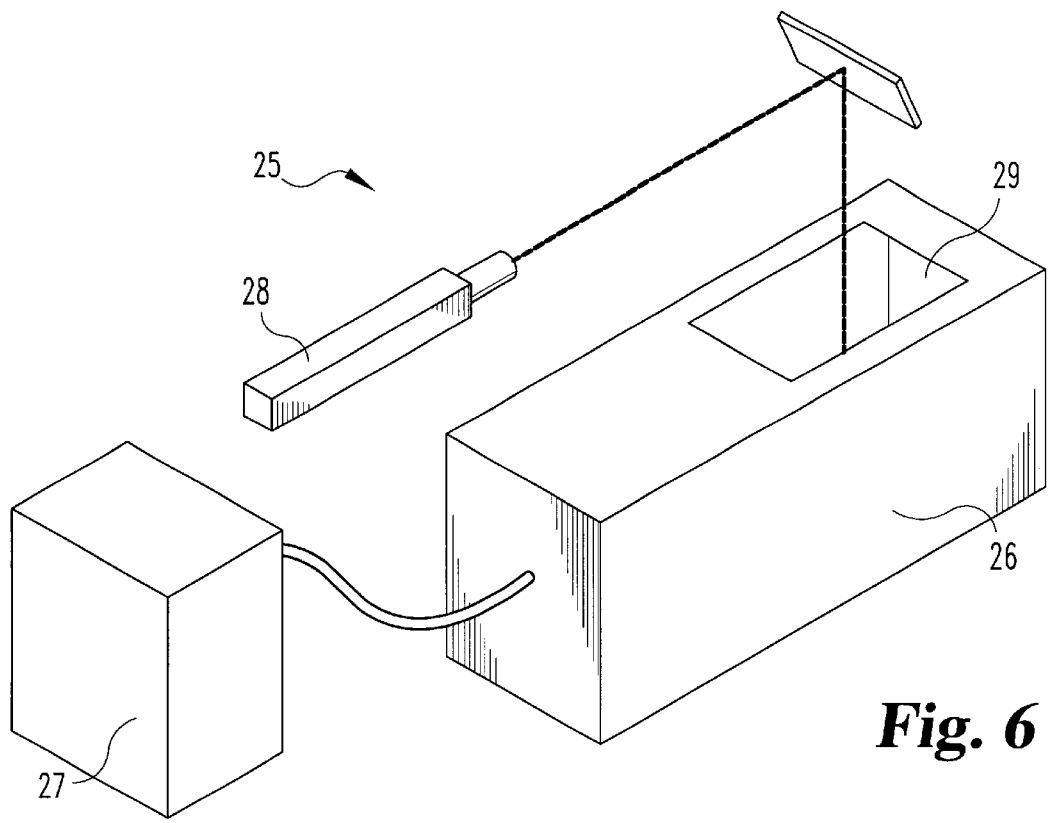
FIG. 6 is an illustrative view of one embodiment of the direct laser processing workstation of the present invention.

With reference to FIG. 6, there is illustrated an apparatus 25 for performing the direct laser processing of a powder bed of material (not illustrated) in order to produce a free form fabrication. The term free form fabrication as used herein includes, unless otherwise specified, the capability to make a solid and/or hollow part. Apparatus 25 includes a chamber 26 within which the direct laser process takes place, and a laser 28 for performing the melting of the material that is then allowed to solidify.

In one form of the present invention the chamber 26 is defined by a fluid tight pressure vessel with a vacuum pumping system 27 coupled thereto for changing the atmosphere within the chamber, and a heat source capable of heating the powder bed of material 30 (FIG. 7) to elevated temperatures. Preheating of the powder material bed 30 prior to the laser beam melting and solidifying aids in the outgassing of the material and improves surface characteristics, wetting and flow. Chamber 26 is designed and constructed so as to be capable of maintaining a high purity atmosphere of select gases. The heat source may be located internal or external to the chamber 26 and is capable of accurately heating and controlling the powder bed to temperatures within the range from ambient to 2000 degrees centigrade, while the vacuum source is capable of providing a high vacuum. It is preferred that the laser melting and solidifying of the material occur when the material bed is at an elevated temperature thereby improving dimensional stability. In one embodiment temperatures within the range of about 500 degrees centigrade to 750 degrees centigrade are preferred for the material bed during the direct laser processing-melting and solidification stages. In another form of the present invention temperatures greater than 750 degrees centigrade are preferred for the material bed during the laser processing. The vacuum preferably being in the range of about $5 \times 10^{-3}$ Torr to about $1 \times 10^{-7}$ Torr, and more preferably is about $5 \times 10^{-5}$ However, other pressures are contemplated herein.

In a more preferred form of the present invention the chamber 26 could be thought of as being analagous to a vacuum furnace that can be adjusted to provide a tightly controlled atmosphere within the chamber. The control of the atmosphere is characterized by the ability to regulate the chemical makeup of the gas within the chamber, degree of vacuum, and temperature. In another form of the present invention an inert atmosphere is utilized to suppress the volatilization of the material constituents within the chamber 26.

The laser 28 provides a beam that selectively melts and allows the resolidification of the material within the chamber 26. Other means for melting the material contemplated herein includes but is not limited to ultrasound, x-ray, and microwave. In one form of the present invention the chamber 216 has a sealed laser transparent window 29 for allowing the passage of the laser beam therethrough. Laser transparent windows are believed known to persons of ordinary skill in the art. Another form of the present invention includes a disposable or indexable laser transmission window apparatus to compensate for window clouding and deposits. Thereby allowing the ready return to a more completely transparent laser transmission window for facilitating process control and reproducability. The means for melting the material could be confined within the chamber 26, the means could be external to the chamber and passable through an opening in the chamber, and/or delivered through a medium coupled to the chamber such as a fiber optic cable.

Figure 7:
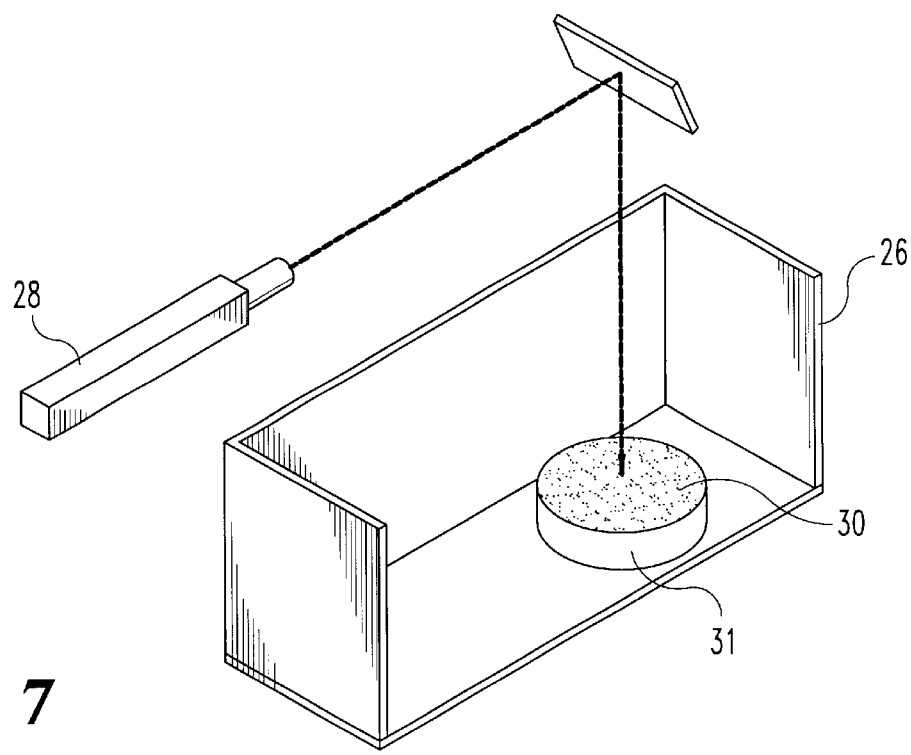
FIG. 7 is a partially fragmented view of the direct laser processing workstation of FIG. 6.

With reference to FIG. 7, there is illustrated chamber 26 with a portion removed for purposes of clarity. Positioned within the chamber 26 is a powder bed of material 30 for melting with the laser beam. The material holder 31 is illustrated as a tray, however other types of material holders are contemplated herein. In one alternate embodiment the material holder fixtures a turbine blade so that the abrasive cermet composite may be directly melted, solidified and bonded on the blade, thereby producing a directly tipped blade. It is understood herein that in one embodiment of the present invention the powder bed of material 30 is not bonded to the material holder 31. In another form of the present invention a member is positioned on the material holder so that the powder bed of material can be bonded thereto, and another form of the present invention has the powder bed directly bonded to the material holder. Another, form of the present invention allows the holding of a component (such as a tool, blade, etc) at various inclinations so as to orient the component for localized repair within the chamber 26. The repair of the component involves the localized heating of the component that is at ambient or near ambient temperatures. The localized heating is done by means such as inductive, electron beam, laser, plasma, focused lamps and/or other suitable means for controlled localized heating. The material holders of the present invention are designed and constructed to withstand the preheat temperatures that the powder beds 30 are subjected to.

Figure 8:
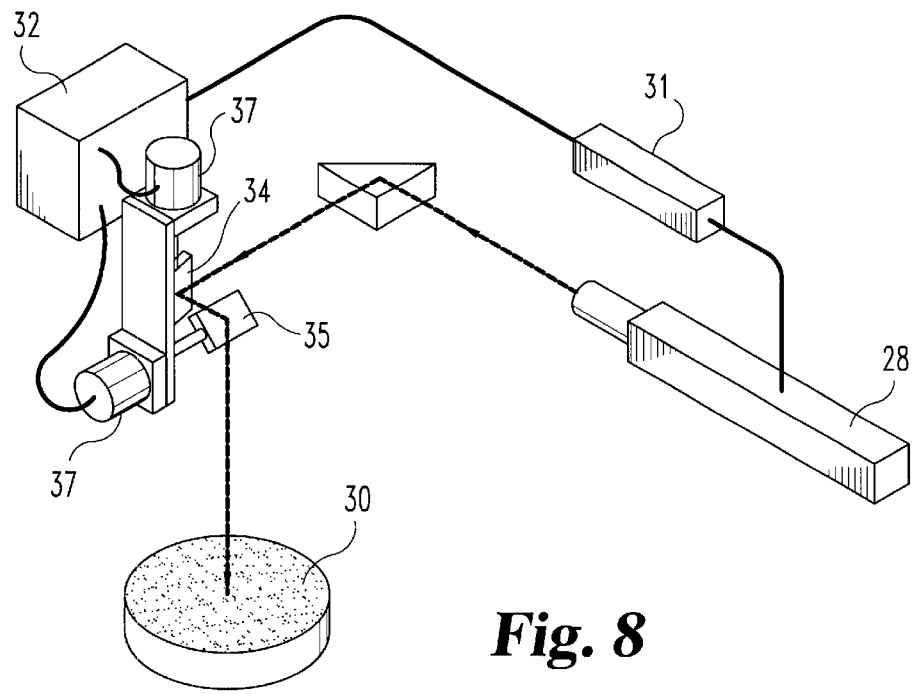
FIG. 8 is a schematic view of the portion of the FIG. 6 apparatus which controls the direction of the laser beam within the direct laser processing workstation.

Referring to FIG. 8, there is illustrated laser 28 and an apparatus for it's control. A preferred laser for direct laser processing is a Nd:YAG laser having sufficient power to melt a portion of material bed. Both single pass through thickness melting of the material, and double pass through thickness melting of the material bed are contemplated herein. However, other types of lasers and different power levels are within the contemplation of the present invention. One embodiment of the present invention utilizes a 250 watt laser. The control of a laser is believed within the contemplation of a person of ordinary skill in the art and the particular laser apparatus control scheme disclosed herein is not meant to limit the present methods and apparatus for making components by direct laser processing.

The components of the laser system as shown in FIG. 8 are integrated within the laser head 28. Laser head 28 thus includes such conventional control elements as described in U.S. Pat. No. 4,863,538, and U.S. Pat. No. 5,156,697; for example a safety shutter, a front mirror assembly, and focusing elements such as diverging and converging lenses. A computer 31 and scanning system 32 are also included for controlling the direction of the laser beam as it impinges upon the powder bed 30. In one form of the present invention computer 31 includes a microprocessor for controlling laser 28, and further includes a CAD/CAM system for generating the data by which the dimensions of the part to be produced is defined. However, other methods to generate the data to define the parts dimensions are contemplated herein. In a preferred form of the present invention the laser scanning position and scan speed are controlled by the computer software.

Scanning system 32 includes prism 33 for redirecting the path of travel of the laser beam. The number of prisms necessary for directing the laser beam to the desired location is based on the physical layout of the apparatus. Alternatively, as is well known in the art one or more fixed mirrors can be used in place of prism 33 for directing the laser beam from the laser 28 to the scanning system 32, depending upon the particular layout of the equipment. Scanning system 32 further includes a pair of mirrors 34, 35 which are driven by respective galvanometers 36, 37. Galvanometers 36, 37 are coupled to their respective mirrors 34, 35 to selectively orient the mirrors 34, 35 and control the aim of the laser beam. Galvanometers 36, 37 are mounted perpendicularly to one another so that mirrors 34, 35 are mounted nominally at a right angle relative to one another. A function generator driver controls the movement of galvanometers 36, 37 to control the aim of the laser beam on the powder bed 30, and in conjunction with computer 31. The function generator driver is coupled to computer 31, so that the CAD/CAM data within the computer can be realized in the directional control of the laser beam via mirrors 34, 35. It is contemplated that alternative scanning systems may be used such as acousto-optic scanners, rotating polygonal mirrors, and resonant mirror scanners.

Figure 9:
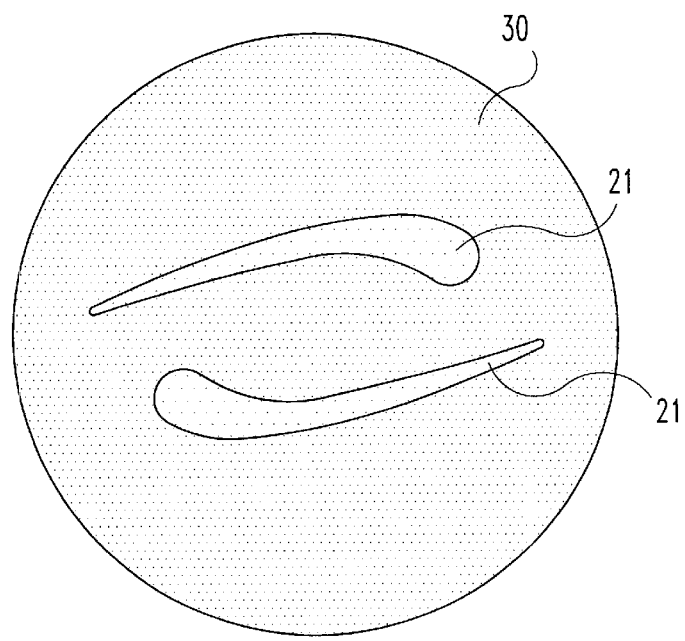
FIG. 9 is an illustrative diagram of of the FIG. 5 abrasive cermet blade tip of FIG. 5 formed in the powder parts bed comprising a portion of FIG. 7.

With reference to FIG. 9, there is illustrated an illustrative plan view of a pair of abrasive cermet components 21 formed in the powder bed 30. The abrasive cermet components 30 formed by the direct laser processing of the material within, the powder bed 30 are them coupled to the turbine blade 16.

An enlarged illustrative view of a laser beam scanning sequence is set forth in FIG. 10. Laser scanning sequences are dependent upon the part geometry and the scanning sequence affects the thermal profile of the part. In a preferred form of the present invention it is desired to have a uniform thermal profile. One method of achieving a uniform thermal profile is by the selection of appropriate laser scan speed, scan spacing, and laser beam energy for the individual scan length vector. A scan length vector defines a portion of the component that will be subjected to a particular pass of the laser beam. In one form of the preferred embodiment the scan spacing is preferred less than 0.100 inches, and the scan spacing is more preferred to be in the range of about 0.0001 inches to about 0.0003 inches. With reference to TABLE 1 there are illustrated scan spacings that were utilized to produce abrasive cermet components by direct laser processing. It is understood that the view in FIG. 10 is merely illustrative and is not intended to be limiting in any fashion such as geometry, scan spacing, beam diameter, etc. Material powder bed 30 becomes a target surface for the laser beam during the direct laser processing.

With the assistance of FIGS. 1–10, there has been provided a description of the method and apparatus to produce a direct laser processed component. More particularly, a description of forming an abrasive cermet component has been set forth, however other components can be fabricated with the present invention. A more detailed description of the process of forming a component by direct laser processing will now be set forth with the aid of FIGS. 1–11.

The direct laser process is a procedure in which the material constituents of the powder bed are directly laser melted and consolidated to produce a solidified part requiring little or no post processing. In the direct laser processing procedure the constituents that were not melted are reusable thereby minimizing the amount of scrap and wasted raw material generated in the process. The components formed are substantially free of voids and cracks and can be fabricated so as to be near net shape. However, in an alternate embodiment the components microstructure is modified by a post process heat treatment. The direct laser process can have parameters adjusted so as produce a highly dense part or a porous part. Further, the process can be used to produce composite components such as cermet abrasive components and/or full density monolithic metallic components.

In one form of the present invention a component fabricated of abrasive cermet material has a size less than about four inches in diameter and a thickness less than about 0.100 inches. A component fabricated from abrasive cermet material having a thickness in the range of about 0.035 to about 0.060 inches is more preferred, and a component fabricated from abrasive cermet material having a thickness of about 0.060 inches is most preferred. Monolithic metallic components having a size less than four inches in diameter and a thickness of up to four inches are contemplated herein. In one embodiment the monolithic metallic components having a thickness greater than 0.100 inches are fabricated by melting the first powder bed layer and them melting additional layers of powder placed over the first previously melted layer of powder. A more preferred form of the monolithic metallic component has a thickness of about 0.100 inches. In one form of the present invention components formed by the direct laser processing which have a laminar structure are contemplated herein.

With reference to FIGS. 11a & 11b there is illustrated the melting and solidification of the metal matrix component constituents 75 of the abrasive cermet composite material. The laser beam melts the metal matrix composite so as to obtain the appropriate amount of flow from the molten material. The appropriate amount of flow is qualitatively defined as the amount of flow necessary to eliminate porosity, producing a high density part while maintaining high dimensional precision and minimizing tearing. The control of the amount of flow is dependent upon many parameters including the atmosphere in which the melting and solidification occurs, degree of preheat of the material powder bed, and characteristics affecting laser energy density such as laser power, scan spacing and scan speed.

The desire to have a uniform thermal profile implies that a very fine scan spacing with a high scan speed are preferred.

The selection of scan speed and scan spacing have a direct affect on the surface roughness of the resulting component. A fine scan spacing will provide a relatively uniform smooth surface, whereas scan speed effects on surface roughness are dependent upon the overall energy density and the associated residence time in the molten material region. For a given material a high scan speed with a high energy density which would produce a long residence molten time will produce a poor surface finish. The same scan speed with a lower energy density will produce a better surface finish. It is preferred to use fine scan spacing and vary the laser power and scan speed so as to deliver different energy densities, thereby producing a short molten residence time with full through thickness melting and density. TABLE 1 provides test data of various examples that have produced acceptable results.

| Temperature (° C.) | Laser Power (Watts) | Scan Spacing (in.) | Scan Speed (in./s) | Energy Density (J/cm$^2$) |
|---|---|---|---|---|
| 300 | 115 | .000166 | 33 | 3202 |
| 300 | 80 | .000166 | 39 | 2088 |
| 450 | 130 | .000166 | 33 | 3678 |
| 55o | 145 | .000166 | 33 | 4102 |
| 615 | 135 | .000166 | 33 | 3819 |
| 750 | 135 | .000275 | 30 | 2495 |
| 750 | 200 | .000275 | 30 | 3696 |
| 860 | 97.5 | .000156 | 61 | 1588 |
| 860 | 150 | .000156 | 61 | 2443 |
| 860 | 105 | .000156 | 99 | 1052 |
| 860 | 110 | .000156 | 109 | 1000 |
| 860 | 97.5 | .000156 | 64 | 1525 |
| 900 | 150 | .000275 | 61 | 1386 |

The test data for for the cermet composite indicated that full through thickness melting was achieved with energy densities of approximately 1900 joules/cm$^2$. The sample of cermet composite included 73.5 wt. % metal alloy, and 26.5 wt. % abrasive grit coating. More preferably the metal alloy was a MarM247. In a preferred form the abrasive grit coating comprises an abrasive grit material with about a 2.5 wt. % to 12 wt. % titanium coating forming a uniform coating on all surfaces of the particles. However at these energy levels (1900 Joules/cm$^2$) the samples illustrated porosity entraped around the grit particle 76 (FIGS. 11a–b). Energy densities in the range of 2,000 to 4,000 joules/cm$^2$ were needed to eliminate porosity retained around the grit particles 76 in the superalloy cermet composite. More specifically in one sample the porosity began to disappear when energy density levels were about 2,500 joules/cm$^2$. At the energy level of 2,500 joules/cm$^2$ there was a transition in microstructure from very fine equiaxed to dendritic. The very fine grained microstructure, ASTM grain size 10, produced in the samples processed at 1,900 joules/cm$^2$ to 2,500 joules/cm$^2$ would be very useful in monolithic metallic materials due to the fact that it may behave superplastically at elevated temperatures. This form of microstructure control would enable the production of equiaxed grain parts thus providing more uniform and improved mechanical properties.

The production of a component by direct laser processing begins by blending the material components together. In one form of the present invention the material is blended for 4–6 hours prior to placing in the chamber 26. The material is then preheated for a period of time to preprocess the material. In a preferred embodiment the preheating occurs within the chamber 25. Thereafter the environment within the chamber 26 is adjusted and the bed of material 30 is subjected to the direct laser processing. Preferably the direct laser processing occurs while the bed of material 30 is at an elevated temperature so as to enhance dimensional stability. The component formed has a structure consistent with a metallurgical casting with a refined microstructure. Further, the microstructure refinement is dependent upon the energy density, atmosphere, and preheating that the material bed 30 was subjected to. For example, control of the energy density in this process will enable region specific microstructure control, thereby enabling a part to have multiple microstructures ranging from equiaxed to dendritic. Further, the component may have regions containing equiaxed, dendritic, directionally solidified, and/or single crystal.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An abrasive cermet component, comprising:
    a metal matrix portion formed of a superalloy material;
    a ceramic abrasive particles portion metalurgically bonded with said metal matrix portion free of any lower melting temperature joining materials.

2. The component of claim 1, wherein said ceramic abrasive particle portion defines a plurality of ceramic abrasive particles dispersed within said metal matrix.

3. The component of claim 2, wherein at least a portion of said plurality of ceramic abrasive particles have a grit size in a range between 80 mesh size and 120 mesh size.

4. The component of claim 3, wherein said plurality of ceramic abrasive particles includes at least one of cubic boron nitride, man made diamond, silicon carbide, and aluminum oxide, and wherein said abrasive cermet being free of any braze material.

5. The component of claim 1, wherein the component is formed at a near net shape.

6. A product, comprising:
    a component formed of material constituents of a powder bed which are directly laser melted and consolidated to produce a high density metallurgically bonded structure free of a lower melting point joining material.

7. The product of claim 6, wherein said material constituents that are not melted are reuseable.

8. The product of claim 7, wherein said lower melting point joining material includes melting point depressants of the type present in braze alloys, and said component has not been subjected to a high temperature diffusion bonding thermal cycle.

9. The product of claim 6, wherein the component formed is substantially free of voids and cracks, and wherein said component is fabricated so as to be near net shape, and wherein the component has not been subjected to a manufacturing thermal cycle which degrades the morphology of the strengthening phase.

10. The product of claim 9, which further includes a primary component, and wherein said component is manufactured directly onto said primary component such that said primary component has not been subjected to a manufacturing thermal cycle which degrades the morphology of the strengthening phase in the primary component.

11. The product of claim 6, wherein said material constituents include a metal powder superalloy matrix and ceramic abrasive particles.

12. The product of claim 11, wherein the component has a thickness in the range of about 0.035 inches to about 0.060 inches.

13. The product of claim 6, wherein the component is a monolithic metallic component, and wherein said component has a thickness greater than 0.100 inches, and wherein said component has a laminar structure.

14. The product of claim 9, which further includes a primary component, and wherein said component is formed directly onto said primary component such that said primary component has not been subjected to a bonding thermal cycle which degrades the morphology of the strengthening phase in the primary component.

15. A product, comprising:
 a monolithic metallic component formed of material constituents of a powder bed which are directly laser melted and consolidated to produce a high density, said component requiring substantially little or no post-processing and has a thickness greater than about 0.100 inches, and wherein said component has a laminar structure.

16. A product, comprising a monolithic metallic component formed of material constituents of a powder bed which are directly laser melted and consolidated to produce a dense structure free of any melting point depressants and having a thickness greater than about 0.100 inches.

17. The product of claim 16, wherein said component has a laminar structure.

18. The product of claim 16, wherein said structure is formed to a near net shape, and wherein said structure is substantially free of voids and cracks.

19. The component of claim 1:
 wherein said ceramic abrasive particle portion includes a plurality of ceramic abrasive particles within said metal matrix; and
 wherein said plurality of ceramic abrasive particles include at least one of cubic boron nitride, man made diamond, silicon carbide, and aluminum oxide.

20. The component of claim 1, wherein the component has a thickness within a range of about 0.035 inches to about 0.060 inches.

21. The product of claim 6, wherein said component is formed as a near net shape structure.

22. The product of claim 6, wherein said material constituents include a metal matrix and ceramic abrasive particles, and wherein said metal matrix and said ceramic abrasive particles are metallurgically bonded together.

23. The product of claim 22, wherein said metal matrix is a superalloy material.

24. An abrasive cermet component, comprising:
 a metal matrix portion;
 a ceramic abrasive particles portion bonded with said metal matrix portion free of any lower melting temperature joining materials, said ceramic abrasive particles portion includes a plurality of ceramic abrasive particles dispersed within said metal matrix, and at least a portion of said plurality of ceramic abrasive particles have a grit size in a range between 80 mesh size and 120 mesh size.

25. The component of claim 24, wherein said plurality of ceramic abrasive particles includes at least one of cubic boron nitride, man made diamond, silicon carbide, and aluminum oxide, and wherein said abrasive cermet being free of any braze material.

26. An abrasive cermet component, comprising:
 a metal matrix portion;
 a ceramic abrasive particles portion metalurgically bonded with said metal matrix portion free of any lower melting temperature joining materials; and
 wherein the component has a thickness within a range of about 0.035 inches to about 0.060 inches.

27. The component of claim 1, wherein the component has not been subjected to a diffusion bonding thermal cycle.

28. An abrasive cermet component, comprising:
 a metal matrix portion formed of a superalloy material;
 a ceramic abrasive particles portion metalurgically bonded with said metal matrix portion free of any lower melting temperature joining materials; and
 wherein the component is formed at a near net shape.

29. The component of claim 28, wherein said superalloy material is one of nickel, titanium and cobalt.

30. The component of claim 28, wherein at least a portion of said plurality of ceramic abrasive particles have a grit size in a range between 80 mesh size and 120 mesh size.

31. An abrasive cermet component, comprising:
 a metal matrix portion;
 a ceramic abrasive particles portion metalurgically bonded with said metal matrix portion free of any lower melting temperature joining materials, said abrasive particle portion defines a plurality of ceramic abrasive particles dispersed within said metal matrix, and wherein at least a portion of said plurality of ceramic abrasive particles have a grit size in a range between 80 mesh size and 120 mesh size.

32. The component of claim 1, wherein said superalloy material is one of nickel, titanium and cobalt.

\* \* \* \* \*